(12) United States Patent
Yanagi et al.

(10) Patent No.: US 10,213,979 B2
(45) Date of Patent: Feb. 26, 2019

(54) ELECTRIC PRESS, BEND-POINT DETECTION METHOD, AND PROGRAM

(71) Applicant: Janome Sewing Machine Co., Ltd., Tokyo (JP)

(72) Inventors: Yumi Yanagi, Tokyo (JP); Kenichiro Hiruma, Tokyo (JP)

(73) Assignee: Janome Sewing Machine Co., Ltd., Tokyo (JP)

( * ) Notice: Subject to any disclaimer, the term of this patent is extended or adjusted under 35 U.S.C. 154(b) by 1182 days.

(21) Appl. No.: 14/473,645

(22) Filed: Aug. 29, 2014

(65) Prior Publication Data

US 2015/0068412 A1    Mar. 12, 2015

(30) Foreign Application Priority Data

Sep. 9, 2013   (JP) .................................. 2013-186807

(51) Int. Cl.
 B30B 15/00   (2006.01)
 B30B 15/26   (2006.01)
 (Continued)

(52) U.S. Cl.
 CPC .............. B30B 15/26 (2013.01); B21D 5/004 (2013.01); B21D 5/006 (2013.01); B21D 5/02 (2013.01);
 (Continued)

(58) Field of Classification Search
 CPC ......... B30B 15/00; B30B 15/14; B30B 15/16; B30B 15/22; B30B 15/0094; B30B 15/26;
 (Continued)

(56) References Cited

U.S. PATENT DOCUMENTS 5,483,750 A * 1/1996 Ooenoki .................. B21D 5/02
  33/534
5,483,874 A * 1/1996 Shimizu .................... B30B 1/18
  100/256

(Continued)

FOREIGN PATENT DOCUMENTS

| JP | H02-047000 A | 2/1990 |
| JP | H05-329690 A | 12/1993 |
| JP | H09-236530 A | 9/1997 |
| JP | 2009-279616 A | 12/2009 |
| KR | 1020080105938 | 12/2008 |

OTHER PUBLICATIONS

Office Action issued in Korean Patent Application No. 10-2014-0104213, dated Apr. 27, 2015, with English Translation (11 pages).

*Primary Examiner* — Jimmy T Nguyen
(74) *Attorney, Agent, or Firm* — Nakanishi IP Associates, LLC

(57) ABSTRACT

A detection unit for detecting a press position and a load at the press position; an input/storage unit for inputting and storing a value serving as a reference for determining a bend point in a relation between the press position and the load at the press position; a slope calculation unit for calculating a slope of the load based on the press position and the load at the press position, which have been detected; and a bend-point determination unit for determining a point, at which the calculated slope of the load exceeds the value serving as the reference for determining the bend point, as the bend point are provided.

3 Claims, 13 Drawing Sheets

(51) Int. Cl.
  *B21D 5/02* (2006.01)
  *G05B 19/37* (2006.01)
  *G05B 19/41* (2006.01)
  *B21D 5/00* (2006.01)
  *B30B 1/18* (2006.01)

(52) U.S. Cl.
  CPC .......... *B30B 1/186* (2013.01); *B30B 15/0094* (2013.01); *G05B 2219/37403* (2013.01)

(58) Field of Classification Search
  CPC .. B30B 1/18; B30B 1/186; B30B 1/23; B30B 1/24; B30B 1/32; B30B 13/00; G05B 2219/36486; G05B 2219/37403; G05B 2219/37582; G05B 2219/45143; B21D 5/01; B21D 5/004; B21D 5/006; G06F 19/00
  USPC .......................................... 100/35, 342, 346
  See application file for complete search history.

(56) References Cited

U.S. PATENT DOCUMENTS

| | | | | |
|---|---|---|---|---|
| 5,564,298 | A * | 10/1996 | DeMeo | B30B 15/0094 72/19.8 |
| 5,669,257 | A * | 9/1997 | Inoue | B30B 1/266 72/20.1 |
| 5,857,366 | A * | 1/1999 | Koyama | B21D 5/004 72/17.3 |
| 6,293,155 | B1 | 9/2001 | Babiel | |
| 6,832,526 | B2 * | 12/2004 | Koyama | B21D 5/02 73/849 |
| 6,941,784 | B2 * | 9/2005 | Koyama | B21D 5/02 72/31.01 |
| 7,503,200 | B2 * | 3/2009 | Gerritsen | B21D 5/0272 100/258 A |
| 8,534,105 | B2 * | 9/2013 | Shibata | B21D 5/004 72/31.01 |
| 2003/0205150 | A1 * | 11/2003 | Nagae | B30B 1/268 100/280 |

* cited by examiner

Prior Art

ELECTRIC PRESS, BEND-POINT DETECTION METHOD, AND PROGRAM

CROSS REFERENCE TO RELATED APPLICATIONS

This application is based on and claims the benefit of priority to Japanese Patent Application No. 2013-186807 filed on Sep. 9, 2013, the contents of which are hereby incorporated by reference in their entirety.

TECHNICAL FIELD

The present invention relates to an electric press, a bend-point detection method, and a program that detect a bend point of a position/load graph in a significant form in a press operation.

BACKGROUND ART

Conventionally, press apparatuses (electric press, electro press) have been known for carrying out a press-fitting operation, etc. in assembly of small components, etc. as shown in FIG. 1 (For example, see Patent Literature 1.).

In a press-fitting operation of such a press apparatus (electric press, electro press), in some cases, it is desired to make a certain determination or stop the press-fitting operation at a point of time (position) when a condition(s) is changed during the press-fitting.

Herein, the above described change of the condition appears as a bend point in a graph of position/pressurization-load as shown in FIG. 12. In order to detect this bend point, there is a method that focuses on the slope thereof. More specifically, a point of time (position) at which the slope exceeds a certain setting is obtained. This method has been conventionally realized as functions such as differential judge and differential stop.

The above described method is an effective method under predetermined conditions. However, on the other hand, if it focuses on the "slope", in other words, the change rate of the load, the bend point cannot be precisely detected in some cases. For example, since the values of the slopes are varied depending on individual parts, a slope that serves as a determination reference cannot be set in some cases.

In such a case, it is conceivable to capture an essential characteristic of "inflection point" that "the change rate of the change rate of load" has an extremum. However, calculating "the change rate of the change rate of load", in other words, obtaining a second-order differential value is to obtain a second-order difference if positions and load values are digitized discrete values.

PRIOR ART LITERATURE

Patent Literature

[Patent Literature 1] Japanese Patent Application Laid-Open No. H05-329690

SUMMARY OF THE INVENTION

However, it is difficult to calculate the slope of the slope of the load based on actually detected load values and make a determination by that. Even the slope of the load has a difficult aspect, and, in the case of the slope of the slope of the load, local vibrations are erroneously detected, and determination is difficult. The calculation of the slope corresponds to a differential operation in other words, and the differential operation is an operation in which a doubled frequency has a doubled value when considered in a frequency domain. Therefore, high-frequency components are enlarged, data is buried in noise as a result, and it is difficult to obtain a significant value.

Based on actual data of press-fitting, an example that draws a position/simple-second-order-difference graph (lower graph in FIG. 13) is shown in FIG. 13. "Simple second-order differences" referred to herein provide the slope of the slope of the load by simply obtaining the differences of differences. In an original graph of position/load (upper graph in FIG. 13), it is observed that a bend point is at around a position of 93.8 mm. However, when the graph of the simple second-order differences thereof is viewed, a peak is certainly present also near the bend point; however, in addition to that, peaks are also at, for example, a press-fitting start part and before and after the bend. In terms of only the largeness of the values, a point slightly after 94 mm has a maximum value. For these reasons, conventionally, bend-point detection using second-order differentials has not been carried out.

Therefore, one or more embodiments of the invention provide an electric press, a bend-point detection method, and a program that detect a bend point of a position/load graph in a significant form in a press operation.

One or more embodiments of the invention provide below items in order to address the above described issues.

Embodiment (1)

One or more embodiments of the invention provide an electric press having: a detection unit for detecting a press position and a load at the press position; a first input/storage unit for inputting a value serving as a reference for determining a bend point in a relation between the press position and the load at the press position and storing the value; a slope calculation unit for calculating a slope of the load based on the press position and the load at the press position detected; and a bend-point determination unit for determining a point, at which the calculated slope of the load exceeds the value serving as the reference for determining the bend point, as the bend point.

Embodiment (2)

One or more embodiments of the invention provide the electric press of (1), wherein the slope calculation unit calculates the slope of the load by using a regression line.

Embodiment (3)

One or more embodiments of the invention provide the electric press of (1), wherein the slope calculation unit smoothes the press position and the load at the press position detected, and calculates the slope of the load based on the press position and the load at the press position smoothed.

Embodiment (4)

One or more embodiments of the invention provide a bend-point detection method of an electric press having at least a detection unit, an input/storage unit, a slope calculation unit, and a bend-point calculation unit, the bend-point detection method including: a first step of detecting a press position and a load at the press position by the load detection unit; a second step of inputting and storing a value serving as a reference for determining a bend point in a relation between the press position and the load at the press position by the input/storage unit; a third step of calculating a slope of the load based on the press position and the load at the press position detected, by the slope calculation unit; and a fourth step of determining a point, at which the obtained slope of the load exceeds the value serving as the reference for determining the bend point, as the bend point by the bend-point determination unit.

Embodiment (5)

One or more embodiments of the invention provide apparatus comprising a non-transitory computer readable storage medium, having a computer program encoded thereon and stored in a computer readable format, the computer program being executable by a computer to cause the computer to execute a bend-point detection method of an electric press comprising at least a detection unit, an input/storage unit, a slope calculation unit, and a bend-pint calculation unit, the bend-point detection method of an electric press comprising: a first step of detecting a press position and a load at the press position by the load detection unit; a second step of inputting and storing a value serving as a reference for determining a bend point in a relation between the press position and the load at the press position by the input/storage unit; a third step of calculating a slope of the load based on the press position and the load at the press position detected, by the slope calculation unit; and a fourth step of determining a point, at which the obtained slope of the load exceeds the value serving as the reference for determining the bend point, as the bend point by the bend-point determination unit.

According to one or more embodiments of the invention, there are effects that the slope of the slope of the load can be calculated as significant amounts and that the bend point can be detected based on that.

BRIEF DESCRIPTION OF DRAWINGS

FIG. 9 is a graph in which FIG. 5, FIG. 6, and FIG. 8 are mutually overlapped.

DETAILED DESCRIPTION OF PREFERRED EMBODIMENTS

Hereinafter, embodiments of the present invention will be explained in detail by using drawings.

Note that constituent elements in the present embodiments can be arbitrarily replaced with existing constituent elements, etc., and various variations including combinations with other existing constituent elements can be also employed. Therefore, the description of the present embodiments does not limit the substance of the invention described in claims.

First Embodiment

A first embodiment of the present invention will be explained by using FIG. 1 to FIG. 9.

Figure 1:
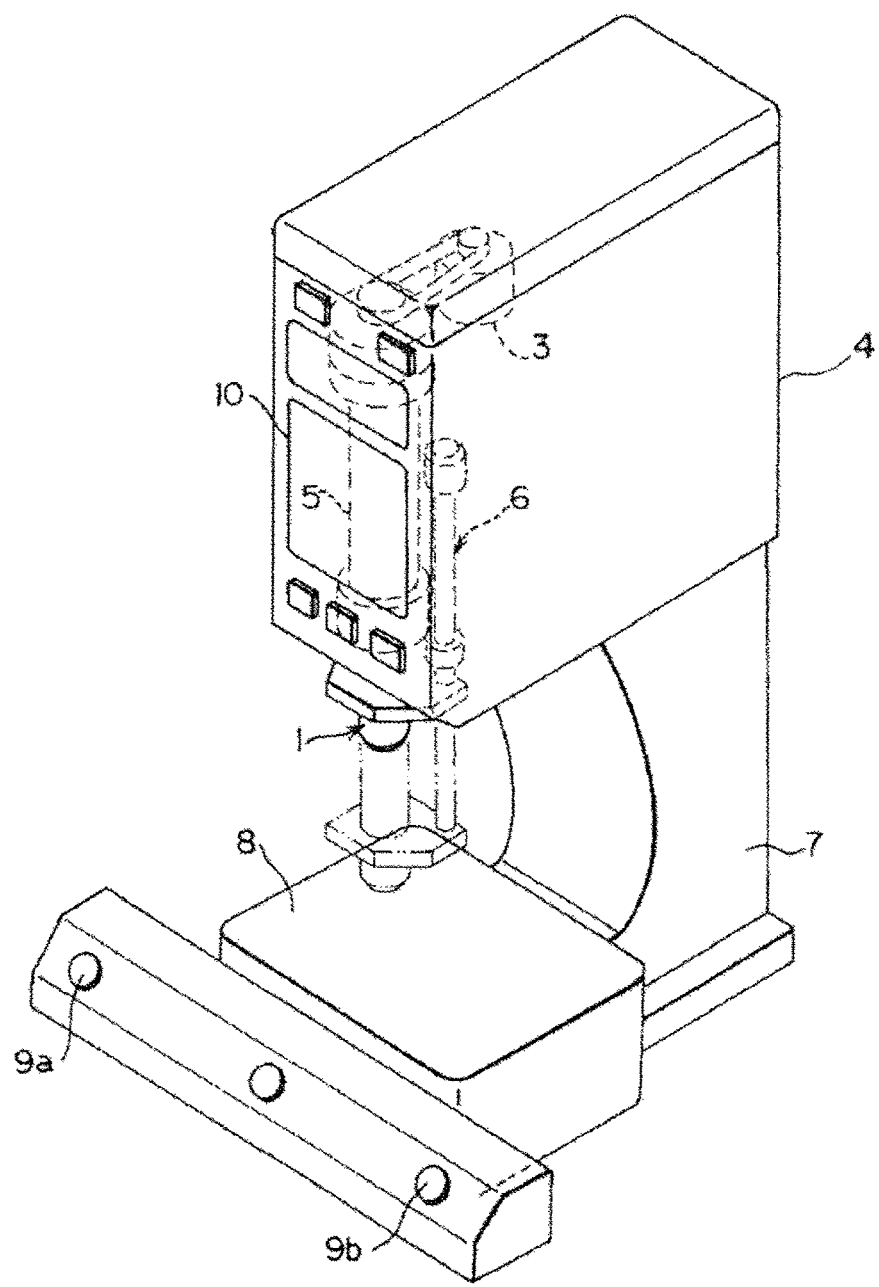
FIG. 1 is an overall view of an electric press according to one or more embodiments of the present invention.
Figure 2:
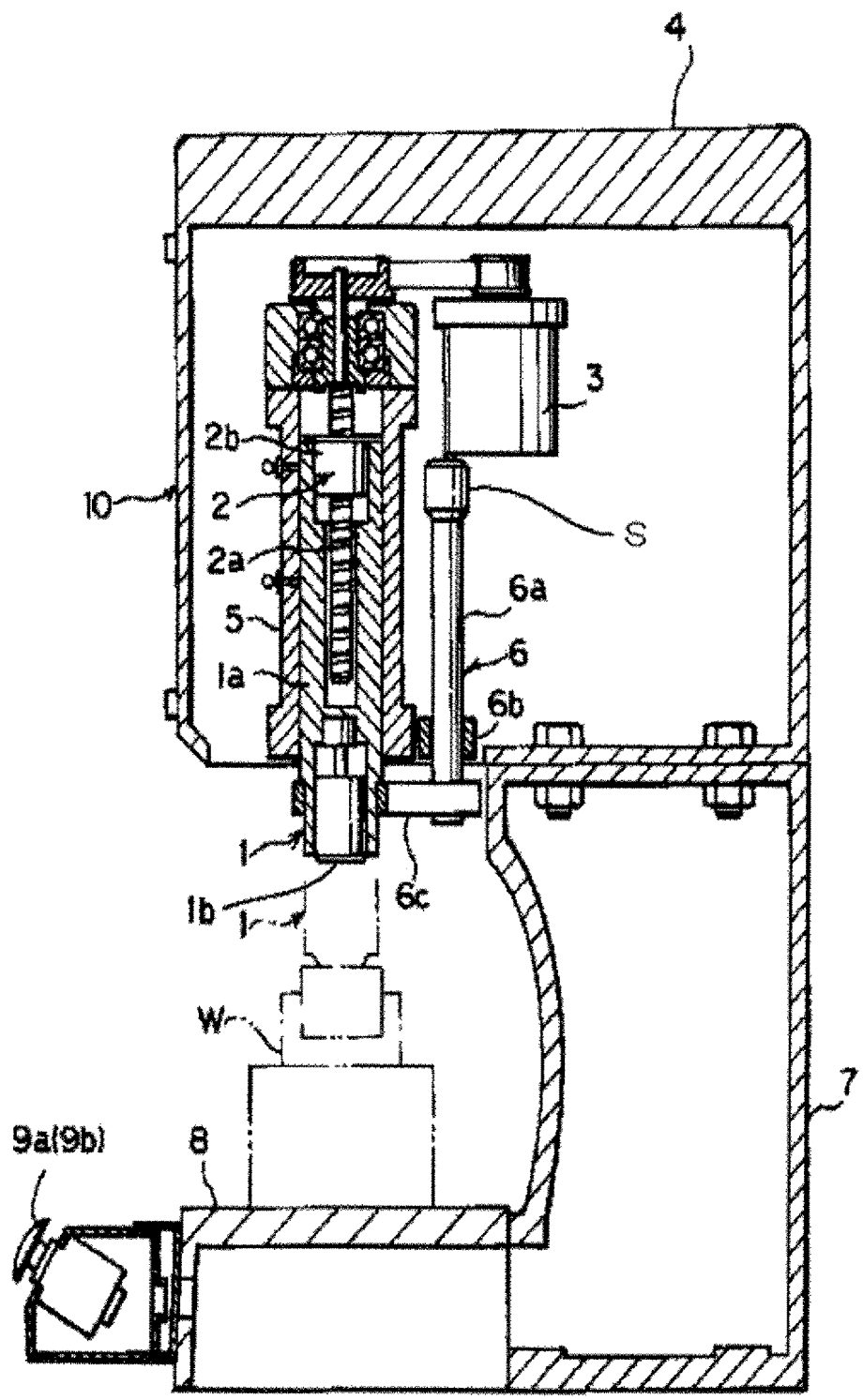
FIG. 2 is a cross-sectional view of an electric press according to one or more embodiments of the present invention.

As shown in FIG. 1 and FIG. 2, an electric press according to the present embodiment consists of: a pressing ram 1, which applies a desired pressure to a workpiece W by up/down movement; a ball screw 2, which applies the up/down movement to the ram 1; and an electric motor 3. These are provided in a head frame body of a casing 4.

First, as shown in FIG. 1, the structure of the ram 1 is formed into a tubular body. Specifically, a hollow part is formed in a tubular main body 1a, which is formed into a cylindrical shape, along the axial direction thereof, a screw shaft 2a of the ball screw 2 can be inserted in the hollow part, and a nut body 2b of the ball screw 2 is fixed to a shaft-length-direction end location of the tubular main body 1a of the ram 1.

A pressing body 1b is configured to be attachable to a lowermost part of the tubular main body 1a. In practice, the pressing body 1b abuts the workpiece W and applies an arbitrary pressure thereto. Furthermore, in some cases, a strain gauge is configured to be attachable to the pressing body 1b so that the pressure applied to the workpiece W can be detected by the strain gauge.

A tubular guide 5 is provided so as to surround an outer peripheral side surface of the tubular main body 1a. The tubular guide 5 is fixed in the casing 4, and the ram 1 is configured to be movable upward/downward along the tubular guide 5. The ram 1 is provided with an anti-vibration guide 6 so as not to rotate on a plane orthogonal to the axial direction. Specifically, as show in FIG. 1 and FIG. 2, the anti-vibration guide 6 consists of an anti-vibration rod 6a, a guiding part 6b, and a coupling plate 6c; the anti-vibration rod 6a is provided via the coupling plate 6c so as to be directed upward from a lower end location of the ram 1 and be parallel to the ram 1; and the anti-vibration rod 6a is configured to be moved in a top-bottom direction along up and down of the ram 1.

Furthermore, the guiding part 6b for causing the anti-vibration rod 6a to pass a predetermined location is fixed in the casing 4, the anti-vibration rod 6a is configured to be moved up and moved down along the guiding part 6b, and the ram 1 is configured so as not to idle in the tubular guide 5 when moved in the top-down direction.

Below the casing 4, a base 8 is provided in the front side via a perpendicular column 7 and immediately below the ram 1, and manipulation buttons 9a and 9b are provided in front of the base 8 and has functions to move down, pause, and move up the ram 1. Specifically, if the ram 1 is to be moved down, the manipulation buttons 9a and 9b are simultaneously pressed; and, if it is to be paused, the manipulation button 9a is pressed, and only the manipulation button 9b is released. Furthermore, the ram 1 is configured to be moved up when the manipulation buttons 9a and 9b are simultaneously released. Moreover, a control unit 10, which is provided in a lateral front side of the casing 4, has a display device 12 and a manipulation device 13.

Figure 3:
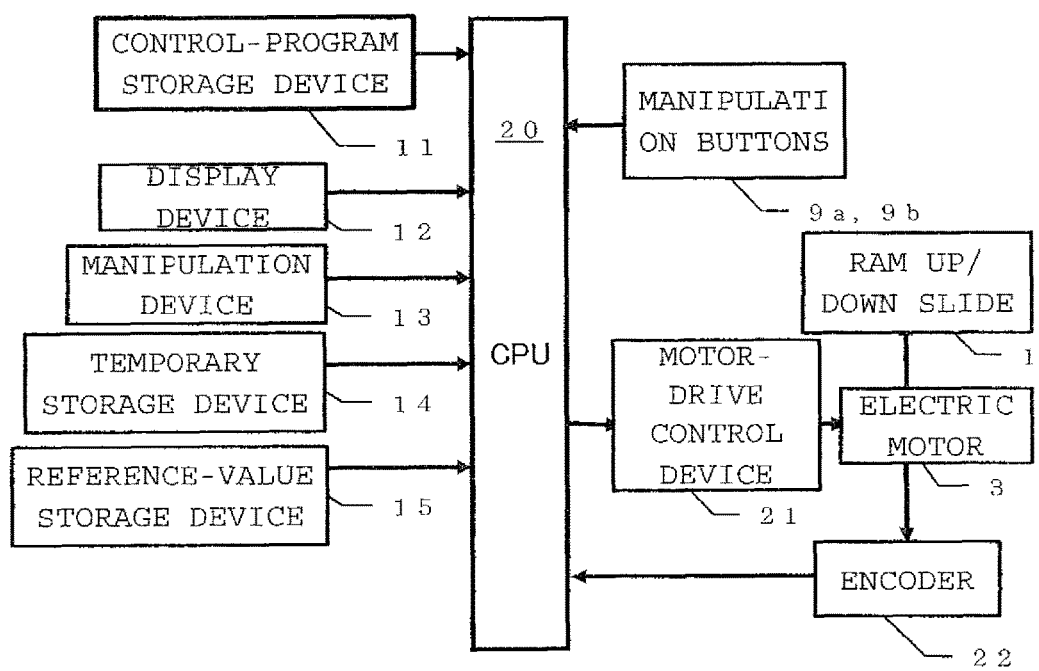
FIG. 3 is a drawing showing a configuration of a control unit of the electric press according to a first embodiment of the present invention.

As shown in FIG. 3, the control unit 10 has a central processing unit 20 and is controlled by a program stored by a control-program storage device 11. Moreover, it has a temporary storage device 14, which stores temporary data, and it further has a reference-value storage device 15, which stores reference values input by using the display device 12 and the manipulation device 13. On the other hand, a motor-drive control device 21 drives the electric motor 3 by commands of the central processing unit 20. An encoder 22, which detects the position of the ram 1, is coupled to the electric motor 3, thereby detecting the moved distance and speed of the ram 1.

Figure 4:
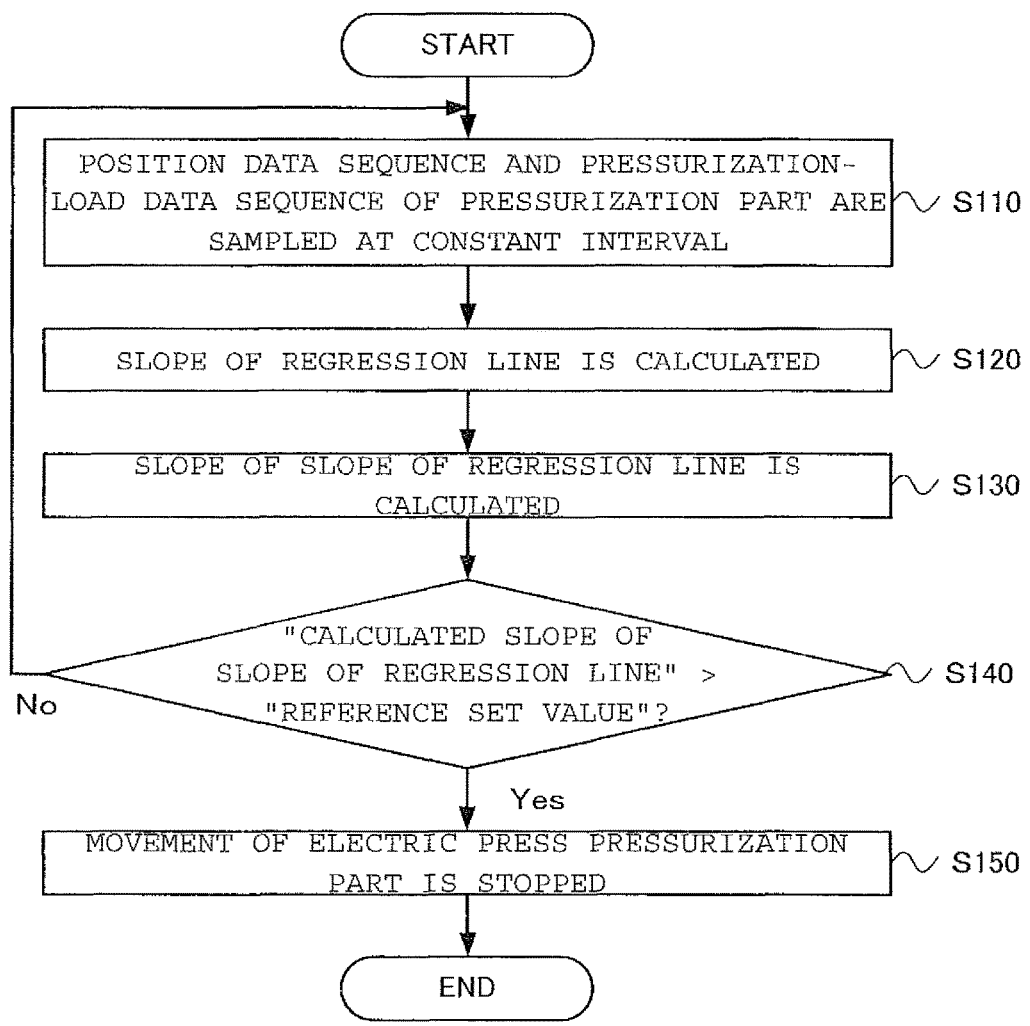
FIG. 4 is a drawing showing a process flow of the electric press according to the first embodiment of the present invention.
Figure 5:
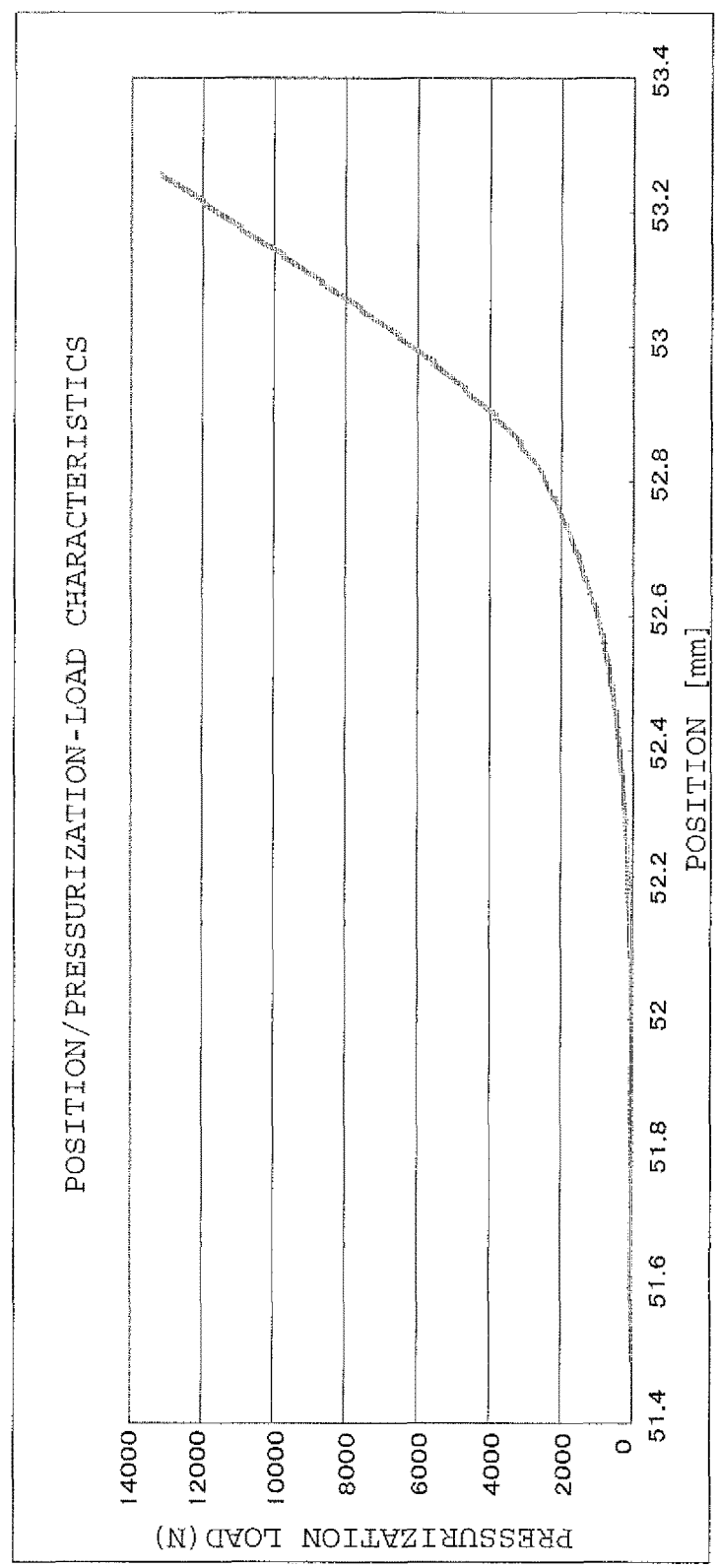
FIG. 5 is a drawing showing the relation of position/load data of the electric press according to the first embodiment of the present invention.

Hereinafter, explanations will be given in accordance with a detection process flow of a bend point shown in FIG. 4. First, in step S110, while the ram 1 is moved down, the position of the ram and the load applied to a work are obtained at a constant time interval. The position of the ram can be obtained from the signals from the encoder 22, which is coupled to the electric motor 3, as the moved distance from an initialization position serving as a reference. Moreover, load values can be obtained from the signals from the strain gauge. For example, position/load data as shown in FIG. 5 is obtained. In the graph of FIG. 5, a bend point is observed near a position of 52.8 [mm].

Figure 6:
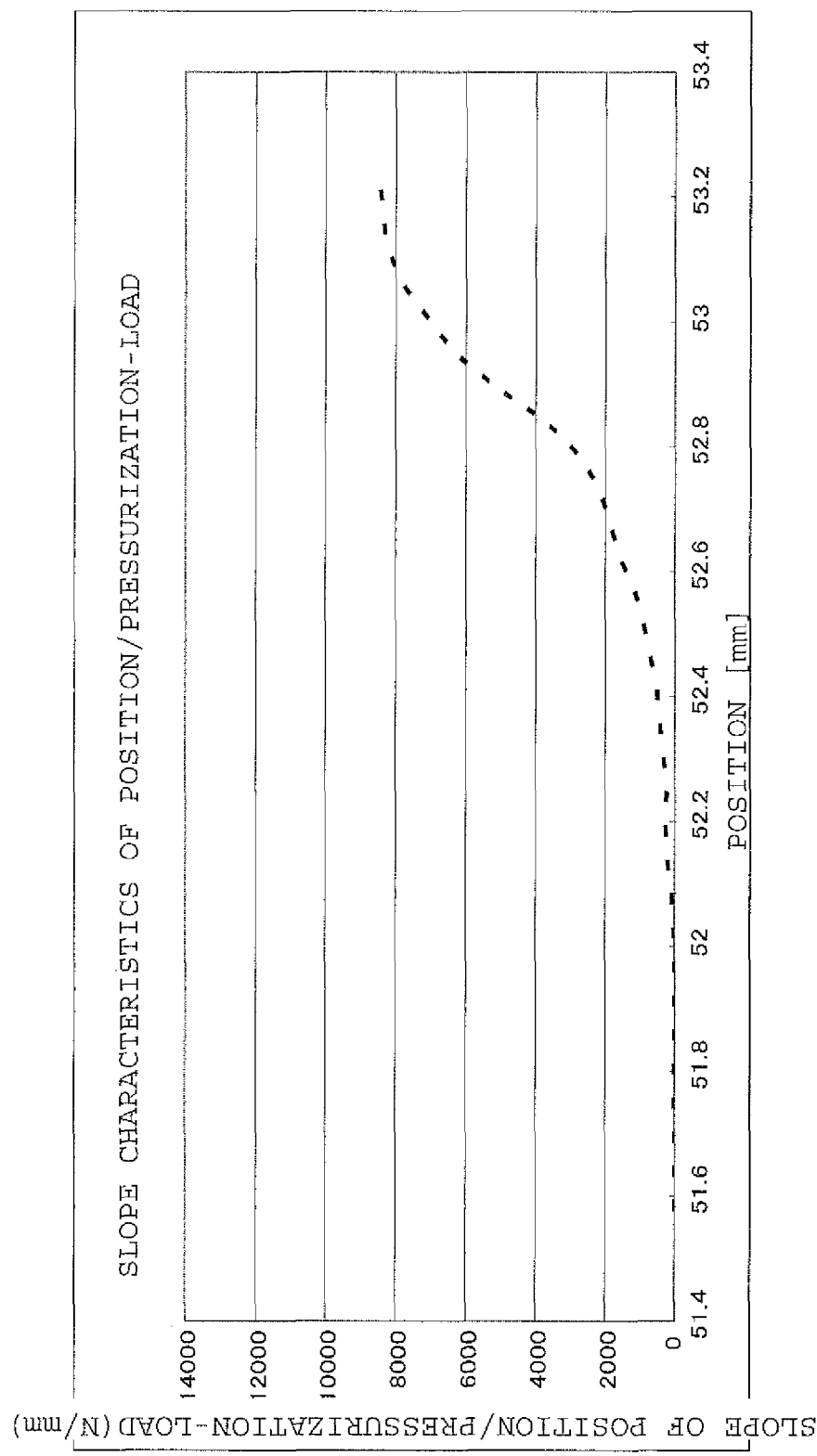
FIG. 6 is a drawing showing the relation of position/load slope data of the electric press according to the first embodiment of the present invention.

Then, in step S120, the slope of the graph (the amount of change of the load value with respect to the position) is calculated by a slope calculating formula of a regression line. For example, regarding n-pieces of data, a position data sequence of a pressurization part is $(x_1, x_2 \ldots x_n)$ and a data sequence of the load is $(y_1, y_2 \ldots y_n)$; in this case, it is assumed that a regression line is drawn with respect to these values. The slope of the regression line is expressed by Formula 1. Thus, the slope of the load, in other words, the values corresponding to first-order differentials are calculated. FIG. 6 shows an example of the graph of the slope of position/load.

$$\text{Slope} = \frac{n\sum_{i=1}^{n} x_i y_i - \sum_{i=1}^{n} x_i \sum_{i=1}^{n} y_i}{n\sum_{i=1}^{n} x_i^2 - \left(\sum_{i=1}^{n} x_i\right)^2} \quad \text{[Formula 1]}$$

Hereinafter, the slope calculation of the regression line will be shown by specific numerical values. For example, there are data sequences of x={1, 3, 4, 6, 7, 10} and y={5.7, 10.4, 11.1, 19.5, 21.8, 26.2}. The slope is calculated by using all of the six pairs of data. In Formula 1, n=6. The results of calculating the terms of sums in Formula 1 are shown in Table 1.

TABLE 1

| i | x | y | xy | $x^2$ |
|---|---|---|---|---|
| 1 | 1 | 5.7 | 5.7 | 1 |
| 2 | 3 | 10.4 | 31.2 | 9 |
| 3 | 4 | 11.1 | 44.4 | 16 |
| 4 | 6 | 19.5 | 117.0 | 36 |
| 5 | 7 | 21.8 | 152.6 | 49 |
| 6 | 10 | 26.2 | 262.0 | 100 |
| Σ | 31 | 94.7 | 612.9 | 211 |

With respect to i of 1 to 6 in a first column, the values of x are provided in a second column, and the vertical sum thereof is shown in a lowermost row Σ. Similarly, y is provided in a third column, xy is provided in a fourth column, $x^2$ is provided in a fifth column, and the sums thereof are shown in the lowermost level. According to these values, the slope according to Formula 1 becomes 2.432 as shown by Formula 2.

$$\{(6\times612.9)-(31\times94.7)\}\div\{(6\times211)-(31\times31)\}=741.7\div305=2.432 \quad \text{[Formula 2]}$$

As reference, an intercept of the regression line is calculated, and the results of obtaining values of y on the regression line (y') from the slope, the intercept, and the values of x are shown in Table 2.

TABLE 2

| i | x | y | y': y on the regression line |
|---|---|---|---|
| 1 | 1 | 5.7 | 5.650 |
| 2 | 3 | 10.4 | 10.514 |
| 3 | 4 | 11.1 | 12.946 |
| 4 | 6 | 19.5 | 17.810 |
| 5 | 7 | 21.8 | 20.241 |
| 6 | 10 | 26.2 | 27.537 |

Figure 7:
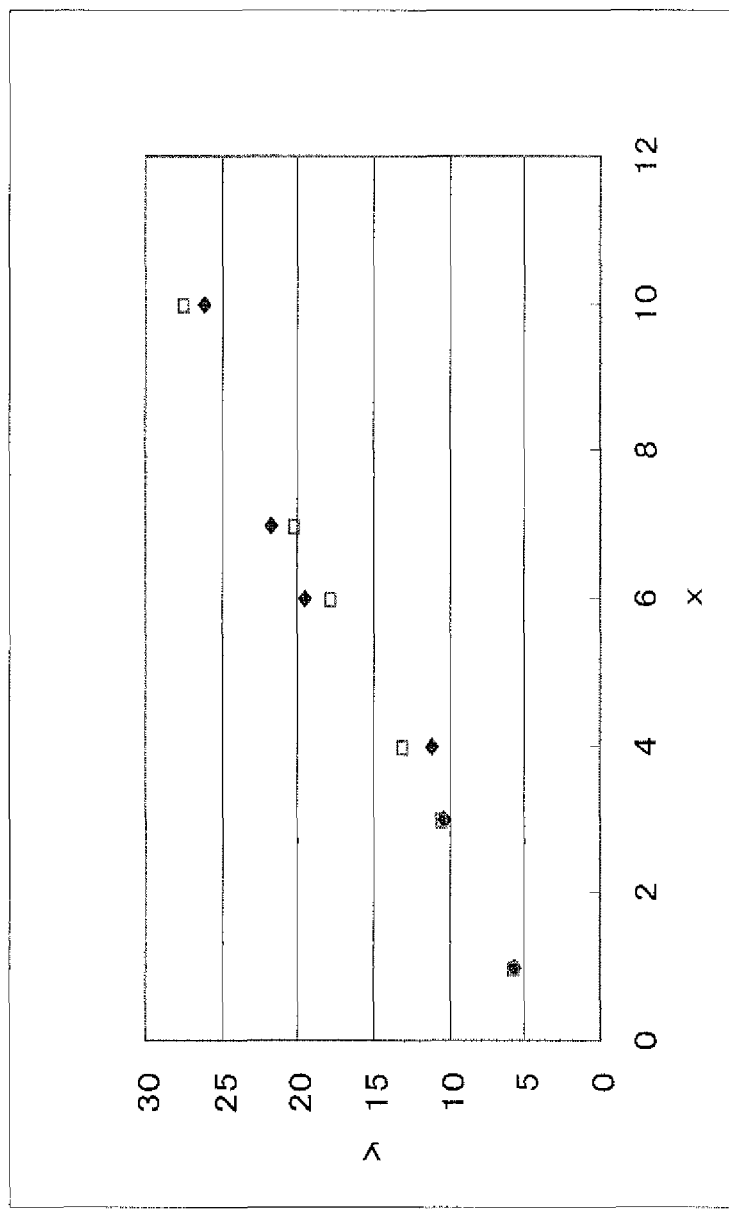
FIG. 7 is a graph showing data sequences of x and y (original data) of the electric press according to the first embodiment of the present invention and the values of y on a regression line (y').

Note that the results of showing the data sequences (original data) of x and y of Table 2 by black points and showing the values (y') of y on the regression line by hollowed points are as shown in FIG. 7.

In the above described manner, the slope of the load, in other words, the values corresponding to the amounts of changes with respect to the positions can be calculated by Formula 1 for obtaining the slope of the regression line. FIG. 7 shows a graph of the slope of the regression line obtained based on the data sequences of position/load shown in FIG. 6. It can be understood from this graph that the slope is increased from around the position of 52.8 mm, the amount of increase thereof is reduced from a point after a position of 53 mm, and the slope becomes approximately constant at 8000 [N/mm].

Figure 8:
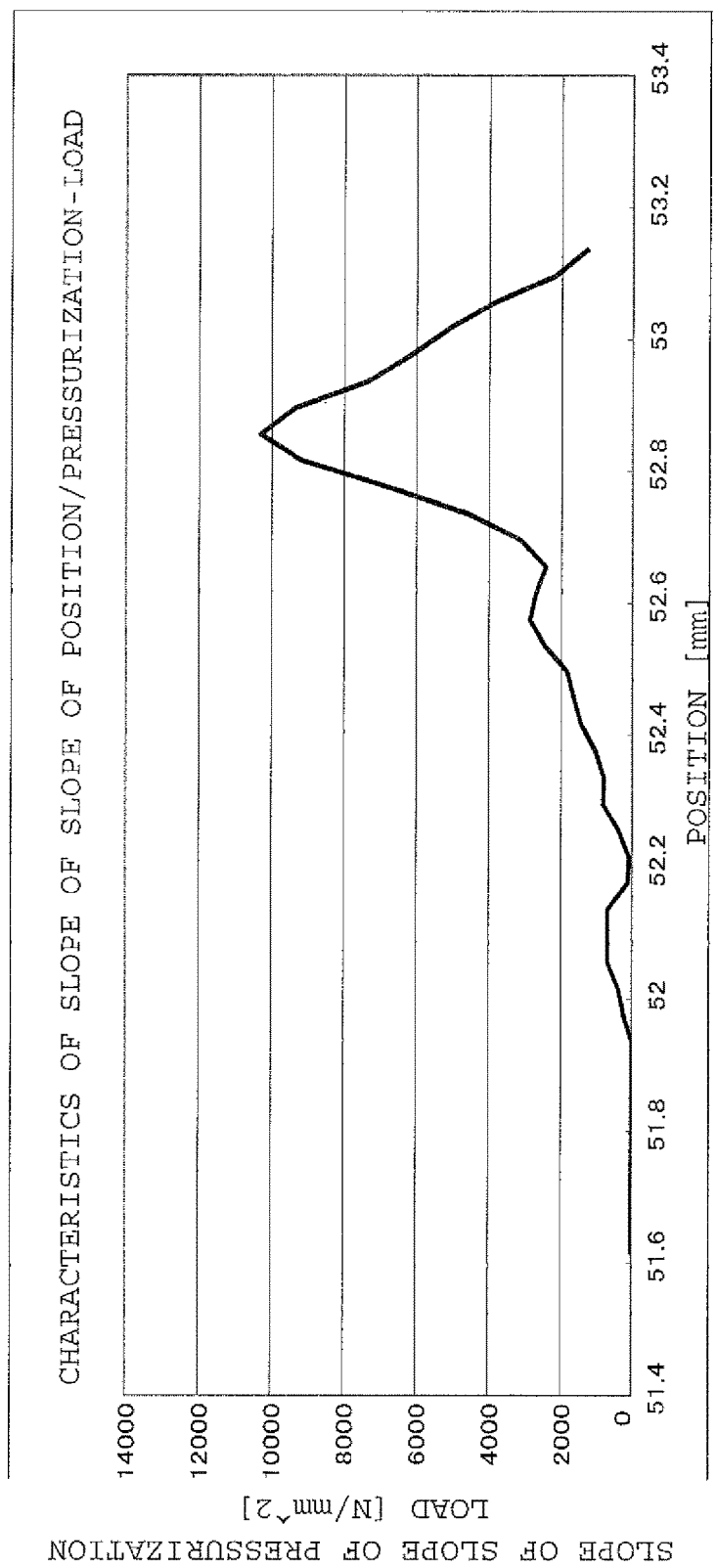
FIG. 8 is a drawing showing the relation of slope data of the slope of position/pressurization-load of the electric press according to the first embodiment of the present invention.
Figure 9:
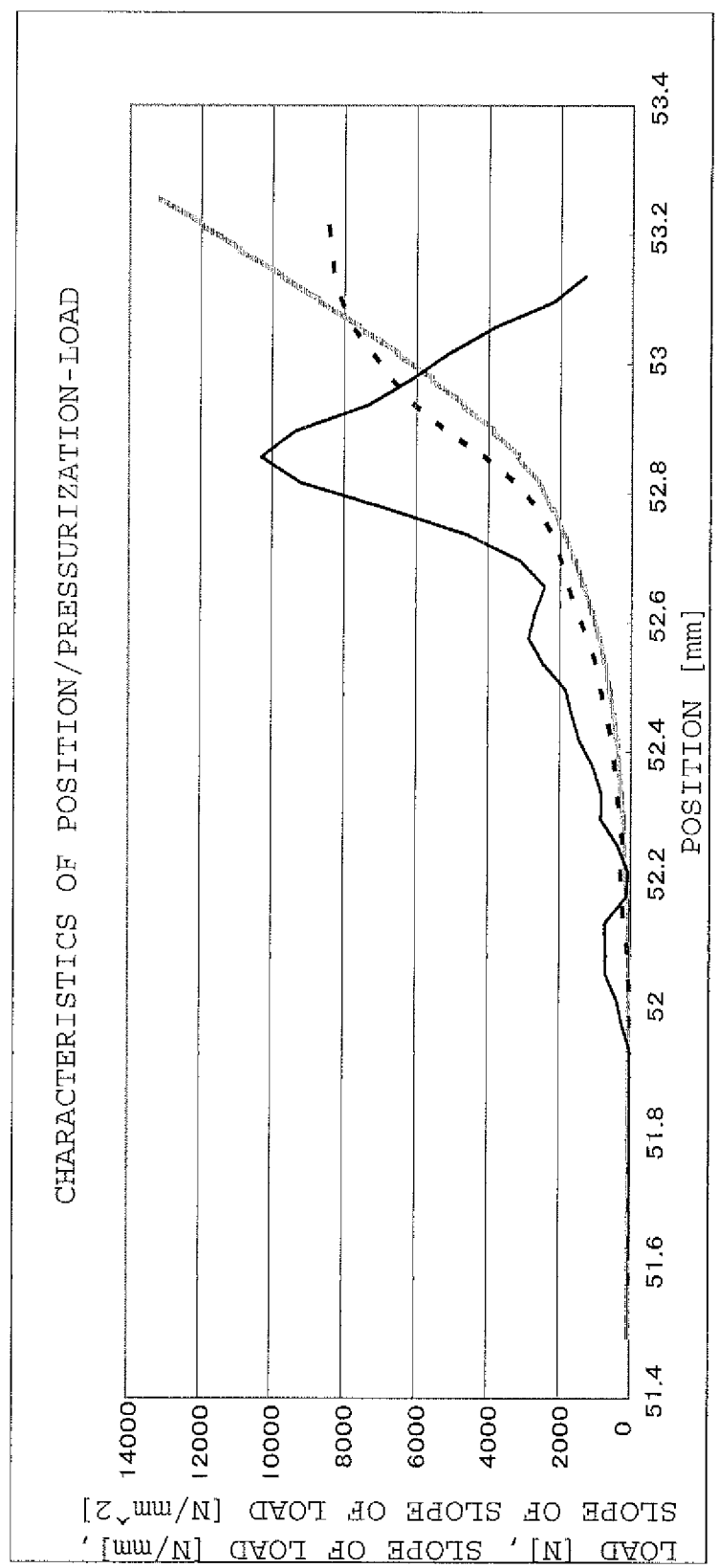

In step S130, based on the data of the slope, the slope of the slope of the load is calculated as the amounts of changes of the amounts of changes of the load values with respect to the positions by using Formula 1 for calculating the slope of a regression line again. The calculation per se is similar. A graph of the slope of the slope of position/pressurization-load obtained as a result is shown in FIG. 8. It can be understood from this graph that a peak is at a point slightly after the position of 52.8 mm. FIG. 9 shows a graph in which FIG. 5, FIG. 6, and FIG. 8 are mutually overlapped. The vertical direction thereof is in an appropriate scale so as to facilitate viewing.

Then, in step S140, a reference set value, which is set in advance, and the calculated value of the slope of the load are compared with each other, a point that exceeds the reference set value is determined as a bend point, and, when the bend point is determined, movement of the pressurization part is stopped (step S150).

As explained above, according to the present embodiment, the slope of the slope of the load can be calculated as significant amounts, and the bend point can be detected based on that.

Second Embodiment

An electric press according to the present embodiment will be explained by using FIG. 10 and FIG. 11. The first embodiment has shown an example of calculating the slope of the load by using the regression line. In the present embodiment, a smoothing process is added thereto.

Figure 10:
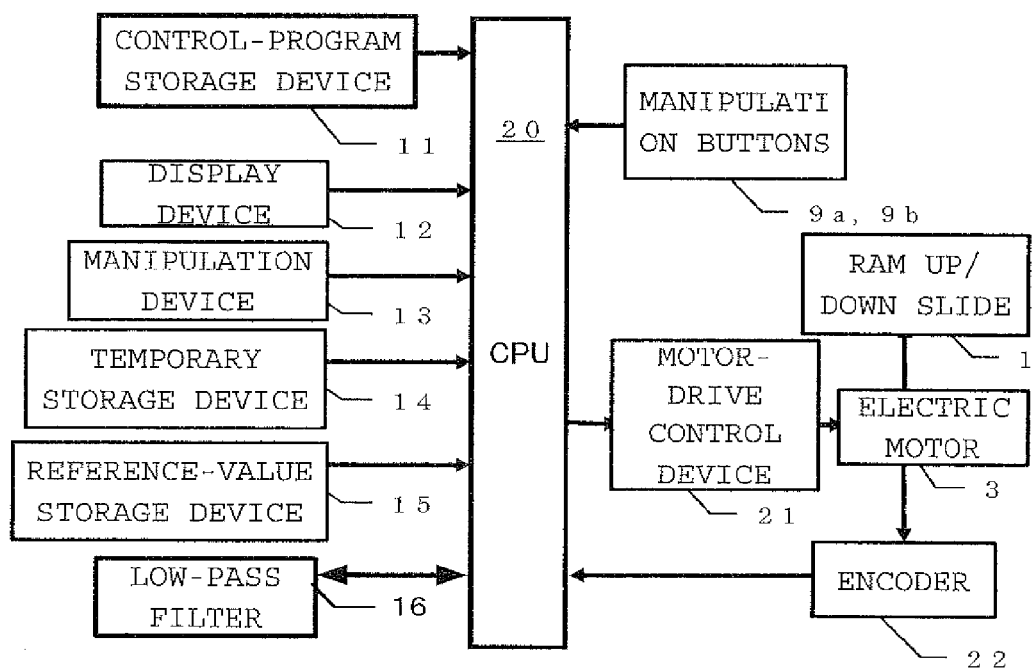
FIG. 10 is a drawing showing a configuration of a control unit of an electric press according to a first embodiment of the present invention.

Therefore, as shown in FIG. 10, the control unit 10 is provided with a low-pass filter (for example, a digital filter).

Figure 11:
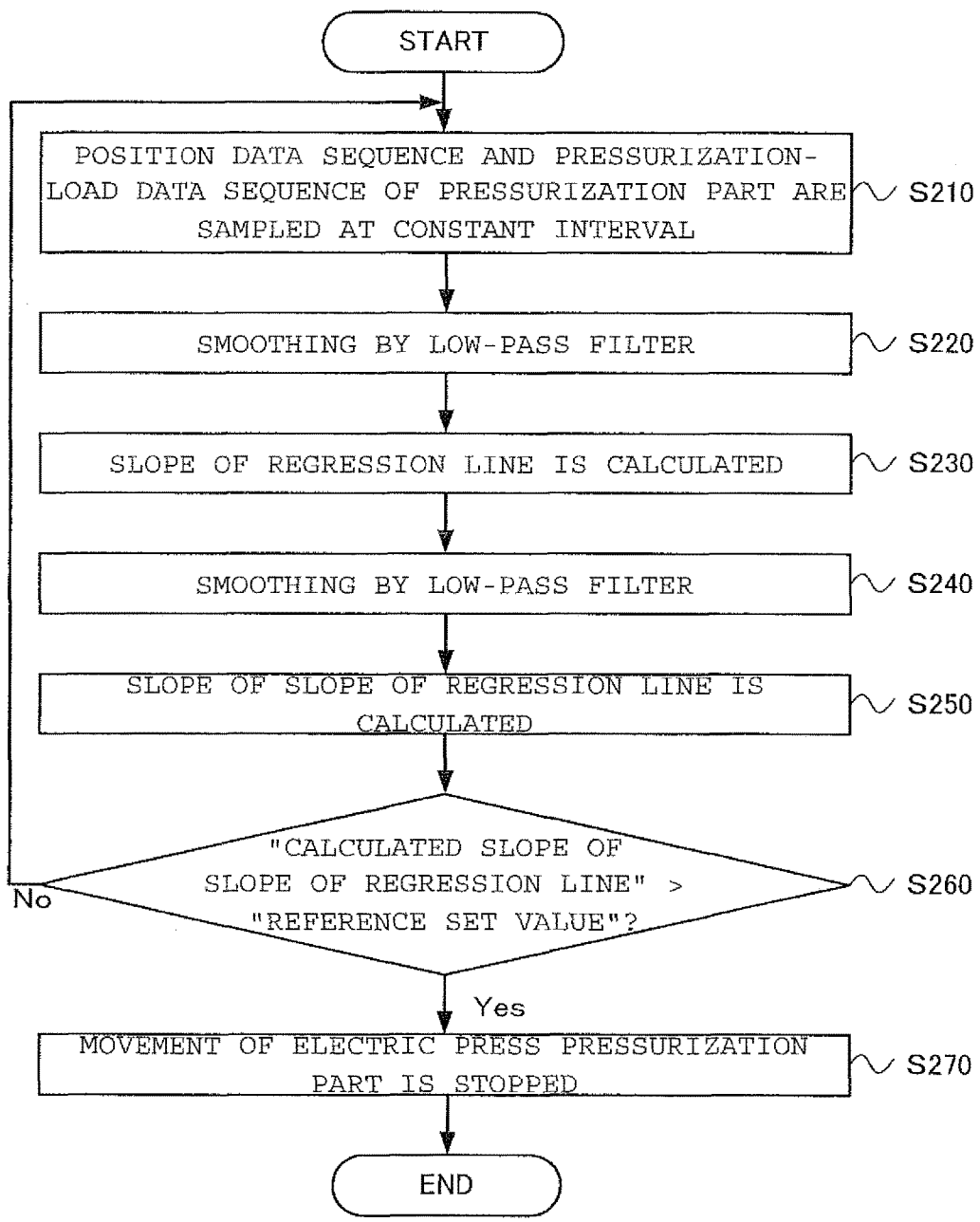
FIG. 11 is a drawing showing a process flow of the electric press according to the first embodiment of the present invention.
Figure 12:
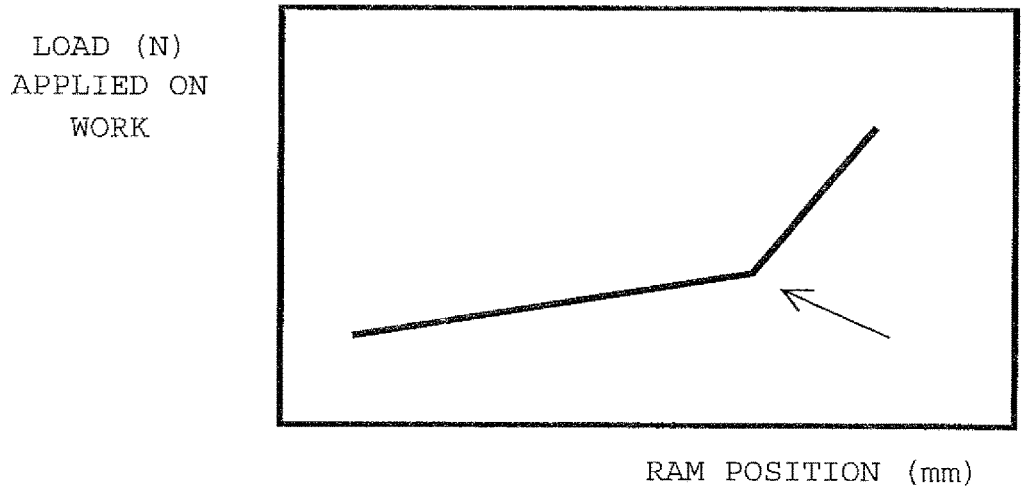
FIG. 12 is a drawing showing a bend point.
Figure 13:
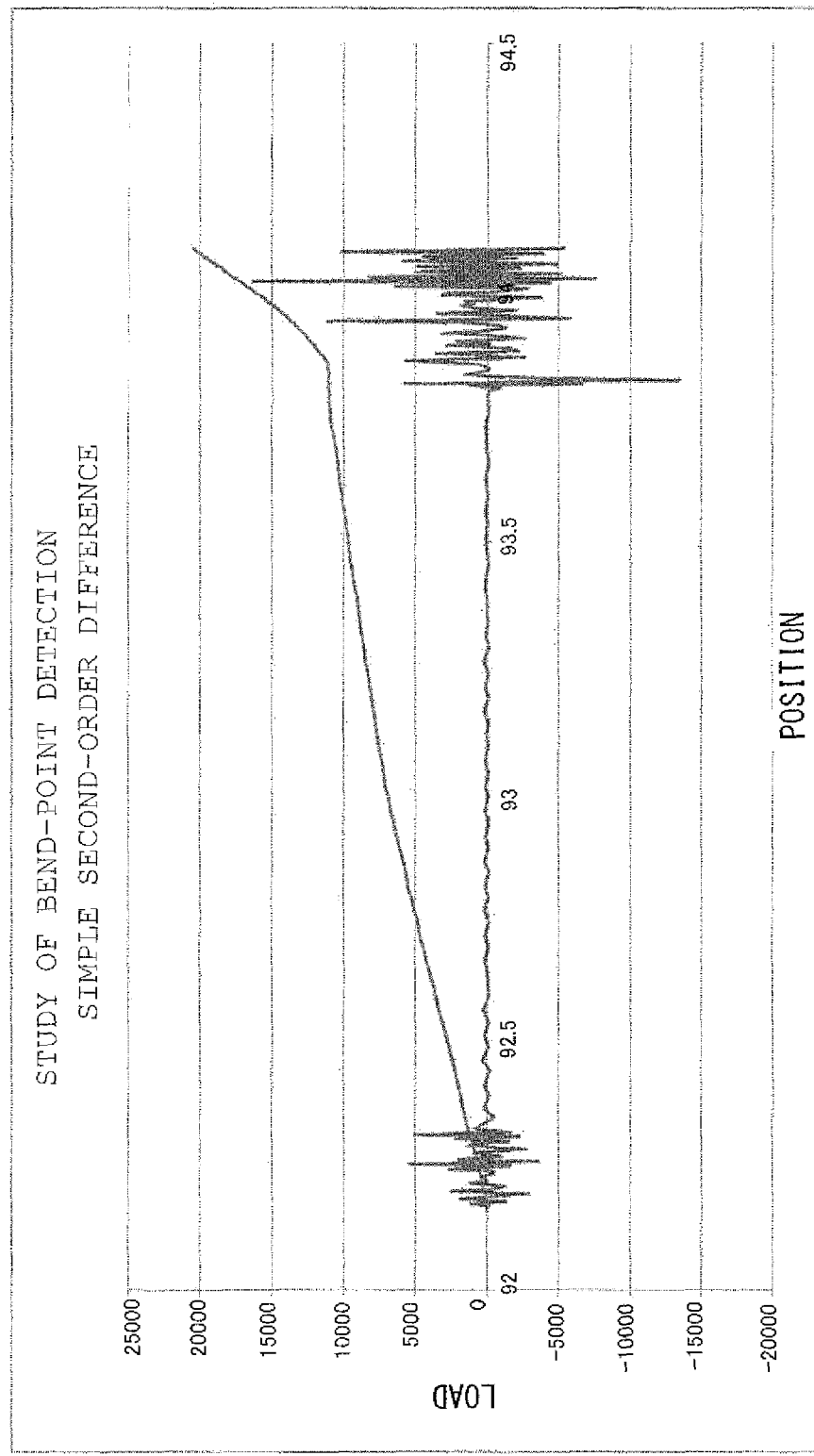
FIG. 13 is an example that draws a position/simple-second-order difference graph based on actual data of press-fitting.

In an actual process, as shown in FIG. 11, after a data sequence of the position of the ram and a data sequence of the load applied to the work are obtained by sampling at every constant time, and, after the slope of the load is calculated by a regression line, the smoothing process by the low-pass filter (for example, a digital filter) is carried out.

In this manner, according to the present embodiment, a graph is smoothed by the smoothing so that a next processing calculation can be carried out well. Note that, as the smoothing process, for example, smoothing such as obtaining a moving average is conceivable.

Note that the electric press of one or more embodiments of the invention can be realized by recording the process of the electric press in a recording medium, which can be read by a computer system and causing the electric press to read and execute the program recorded in the recording medium. The computer system referred to herein includes an OS and hardware such as peripheral devices.

If a WWW (World Wide Web) system is utilized, the "computer system" also includes a homepage providing environment (or display environment). The above described program may be transmitted from the computer system, which stores the program in a storage device or the like, to another computer system via a transmission medium or by transmission waves in the transmission medium. Herein, the "transmission medium", which transmits the program, refers to a medium having a function to transmit information like a network (communication network) such as the Internet or a communication line (communication wire) such as a telephone line.

The above described program may be a program for realizing part of the above described functions. Furthermore, the above described program may be a so-called difference file (difference program), which can realize the above described functions by combination with a program(s) already recorded in the computer system.

Hereinabove, the embodiments of this invention have been described in detail with reference to drawings. However, specific configurations thereof are not limited to the embodiments, but include designs, etc. within a range not departing from the gist of this invention.

DESCRIPTION OF REFERENCE NUMERALS

1; RAM
2; BALL SCREW
3; ELECTRIC MOTOR
4; CASING
1a; TUBULAR MAIN BODY
2a; SCREW SHAFT
2b; NUT BODY
1b; PRESSING BODY
5; TUBULAR GUIDE
6; ANTI-VIBRATION GUIDE
6a; ANTI-VIBRATION ROD
6b; GUIDING PART
6c; COUPLING PLATE
7; COLUMN
8; BASE
9a; MANIPULATION BUTTON
9b; MANIPULATION BUTTON
10; CONTROL UNIT
11; CONTROL-PROGRAM STORAGE DEVICE
12; DISPLAY DEVICE
13; MANIPULATION DEVICE
14; TEMPORARY STORAGE DEVICE
15; REFERENCE-VALUE STORAGE DEVICE
16; LOW-PASS FILTER
20; CENTRAL PROCESSING UNIT (CPU)
21; MOTOR-DRIVE CONTROL DEVICE
22; ENCODER

The invention claimed is:

1. An electric press comprising:
a detection unit configured to detect a press position and a first data sequence of a load at the press position;
an input and storage unit configured to input and store a value serving as a reference that determines a bend point in a relation between the press position and the first data sequence of the load at the press position;
a slope calculation unit configured to calculate a slope of the load based on the press position and the first data sequence of the load at the press position detected, according to a first regression line, wherein the slope of the load is calculated by the following formula, (i), $$\text{the slope of the load} = \frac{n\sum_{i=1}^{n} x_i y_i - \sum_{i=1}^{n} x_i \sum_{i=1}^{n} y_i}{n\sum_{i=1}^{n} x_i^2 - \left(\sum_{i=1}^{n} x_i\right)^2} \quad \text{[Formula (i)]}$$

a slope-of-slope calculation unit configured to calculate a slope of the slope of the load calculated by the slope calculation unit as an amount of change of an amount of change of a load value with respect to the press position by using the formula (i) for calculating a slope of the first regression line, according to a second regression line,
wherein, in the formula (i), n denotes a number of data, xi denotes position data of a pressurization part, and yi denotes data of a load; and
a bend-point determination unit configured to determine a point, at which the calculated slope of the slope of the load exceeds the value serving as the reference for determining the bend point, as the bend point.

2. The electric press according to claim 1,
wherein the slope calculation unit smoothes the press position and the first data sequence of the load at the press position detected, and calculates the slope of the load based on the press position and the load at the press position smoothed, and wherein the slope-of-slope calculation unit smoothes the press position and the second data sequence of the slope of the load at the press position smoothed, and calculates the slope of the slope of the load based on the press position and the load at the press position smoothed.

3. A bend-point detection method of an electric press having at least a detection unit, an input and storage unit, a slope calculation unit, and a bend-point determination unit, the bend-point detection method including:

a first step of detecting a press position and first data sequence of a load at the press position by the detection unit;

a second step of inputting and storing a value serving as a reference for determining a bend point in a relation between the press position and the load at the press position by the input and storage unit;

a third step of calculating a slope of the load based on the press position and the first data sequence of the load at the press position detected by the slope calculation unit, according to a first regression line, wherein the slope of the load is calculated by the following formula (i), $$\text{the slope of the load} = \frac{n\sum_{i=1}^{n} x_i y_i - \sum_{i=1}^{n} x_i \sum_{i=1}^{n} y_i}{n\sum_{i=1}^{n} x_i^2 - \left(\sum_{i=1}^{n} x_i\right)} \quad \text{[Formula (i)]}$$

a fourth step of calculating a slope of the slope calculated by the slope calculation unit, as an amount of change of an amount of change of a load value with respect to the press position by using the formula (i) for calculating a slope of the first regression line, according to a second regression line, wherein, in the formula (i), n denotes a number of data, xi denotes position data of a pressurization part, and yi denotes data of a load; and a fifth step of determining a point, at which the calculated slope of the slope of the load exceeds the value serving as the reference for determining the bend point, as the bend point by the bend-point determination unit.

* * * * *